United States Patent [19]

Kooima

[11] Patent Number: 4,632,629

[45] Date of Patent: Dec. 30, 1986

[54] WHEEL LIFT APPARATUS FOR TOWING VEHICLES

[76] Inventor: Roger D. Kooima, 224 N. Milwaukee, Canton, S. Dak. 57013

[21] Appl. No.: 765,254

[22] Filed: Aug. 12, 1985

[51] Int. Cl.$^4$ .............................................. B60P 3/12
[52] U.S. Cl. ..................................... 414/563; 280/402
[58] Field of Search ...................... 414/563, 426–430; 280/402

[56] References Cited

U.S. PATENT DOCUMENTS

| | | | |
|---|---|---|---|
| 2,183,478 | 12/1939 | Holmes et al. | 414/563 |
| 2,436,000 | 2/1948 | Fleming | 414/563 |
| 2,449,146 | 9/1948 | Ryan | 414/563 |
| 2,659,501 | 11/1953 | Pelaez | 414/563 |
| 3,322,396 | 5/1967 | Hubbard | 414/563 X |
| 3,434,607 | 3/1969 | Nelson | 280/402 |
| 3,667,630 | 6/1970 | Scott | 414/563 |
| 4,152,006 | 5/1979 | Dunlap | 414/563 X |
| 4,384,817 | 5/1983 | Peterson | 414/563 |
| 4,451,193 | 5/1984 | Cannon, Jr. et al. | 414/563 |
| 4,473,237 | 9/1984 | Lind | 414/563 X |
| 4,487,544 | 12/1984 | Hubbard | 414/563 |
| 4,534,579 | 8/1985 | Shackelford, Sr. | 414/563 X |
| 4,557,496 | 12/1985 | Sill | 414/563 X |
| 4,573,857 | 3/1986 | Porter, Sr. et al. | 414/563 |
| 4,586,866 | 5/1986 | Kvamme | 414/563 |

FOREIGN PATENT DOCUMENTS 818771  5/1959  Fed. Rep. of Germany .

OTHER PUBLICATIONS

Brochure, entitled "*Holmes Universal Towing Carriage UTC-100*", published 1982.
Diversified Products Mfg. Co., Peterson Scoop (undated).

*Primary Examiner*—Joseph E. Valenza
*Assistant Examiner*—David A. Bucci
*Attorney, Agent, or Firm*—Wood, Dalton, Phillips, Mason & Rowe

[57] ABSTRACT

A wheel lift towing apparatus is disclosed for mounting on the rear end of a tow truck or other towing vehicle for engaging the wheels of an immobilized vehicle to be towed. A rearwardly extending boom assembly is mounted at the rear end of the tow truck. Wheel lift carriages are mounted on the free end of the boom assembly for engaging the wheels of the immobilized vehicle for lifting the vehicle. An inclined ramp and follower mechanism is provided between a mounting bracket on the tow truck and the boom assembly for guiding upward lifting movement of the boom assembly and for effecting angular upward movement of the wheel lift carriages greater than the upper movement of the forward end of the boom assembly. Each wheel lift carriage is in the form of a fork-like structure having a pair of arms positionable on the inner and outer sides of a wheel. The inner arm has an aperture for insertion thereinto of the inner end of the support rod. The outer arm has an upwardly opening notch for insertion thereinto of the outer end of the support rod in a direction generally transversely of the arm.

12 Claims, 8 Drawing Figures

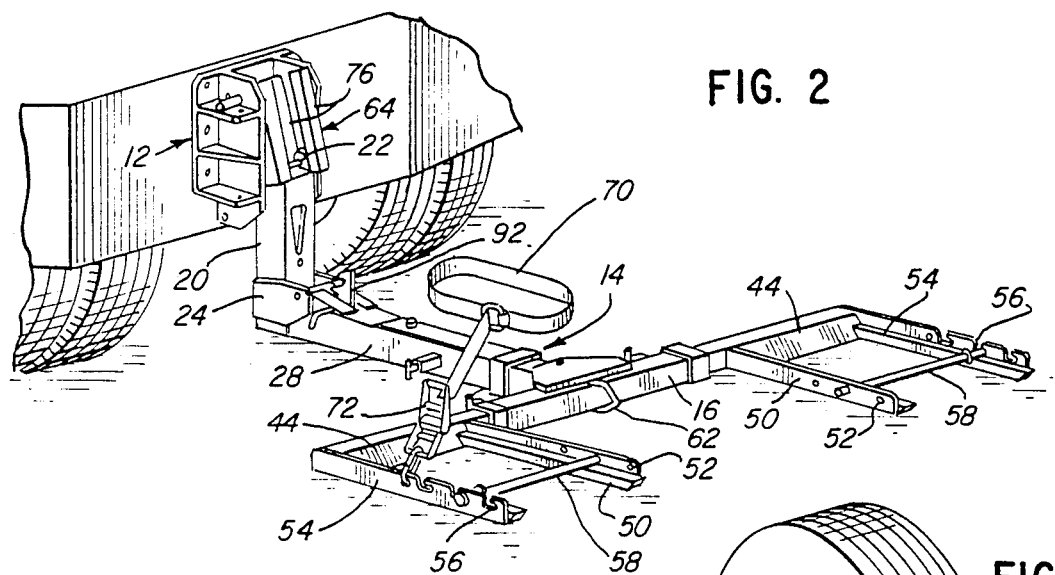
FIG. 2
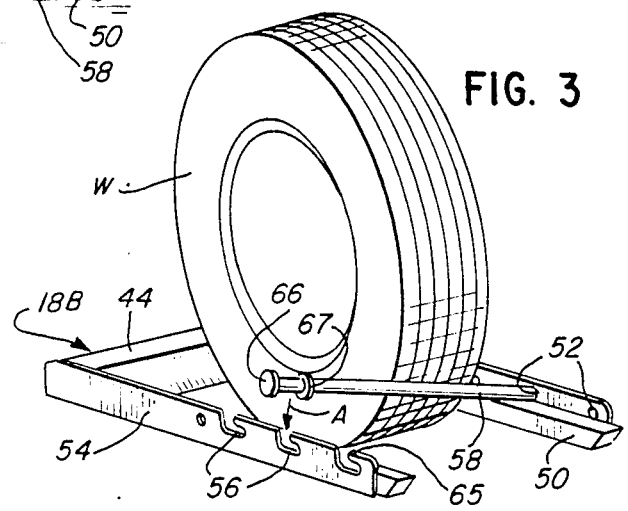
FIG. 3
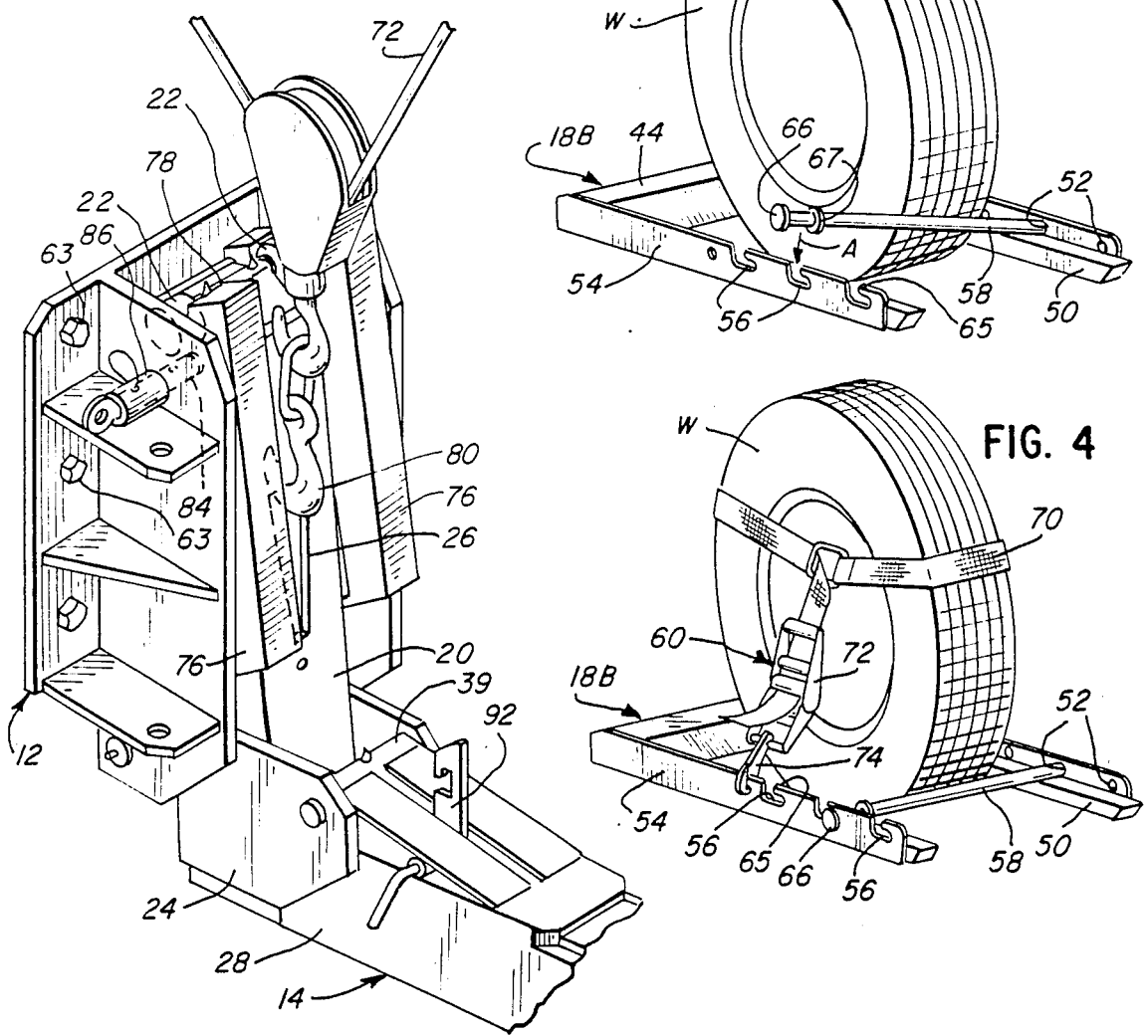
FIG. 4
FIG. 5

WHEEL LIFT APPARATUS FOR TOWING VEHICLES

BACKGROUND OF THE INVENTION

This invention relates to mechanisms for towing vehicles and, more particularly, to a wheel lift towing apparatus for engaging the front or rear wheels of a vehicle to be towed and for lifting the vehicle.

A wide variety of towing mechanisms are available for use on the rear end of a tow truck or other towing vehicle and which are adapted to lift one end of an immobilized vehicle for towing purposes. Such mechanisms range from elaborate overhead boom structures, normally employing slings for engaging an end of the vehicle to be towed, to rather crude jack type apparatus mounted in the rear bumper area of the towing vehicle. The most widely used mechanisms presently available include some form of wheel lift apparatus for engaging either the front or rear wheels of an immobilized vehicle to lift the vehicle during towing. The wheel lift apparatus may be suspended from an overhead boom or crane type winch or, as has become increasingly popular, the wheel lift apparatus is mounted at the rear end of the tow truck.

Conventionally, the rear mounted wheel lift apparatus include means for mounting a lower boom to the rear end of the tow truck, the boom extending toward the underside of the immobilized vehicle. A pair of cradle-type carriages are mounted on the free end of the lower boom in transversely spaced relationship for engaging the underside of the wheels. The boom and carriages are raised and lowered to raise and lower the immobilized vehicle. Raising of the boom and carriages can be accomplished by such means as hydraulic piston and cylinder devices or by a winch cable lowered from the overhead boom. The lower boom and carriage assembly is mounted at the rear bumper area of the tow truck by various types of means for affording raising and lowering of the assembly. For instance, the lower boom simply may be pivotally mounted to the rear of the tow truck or to the underside of the truck. The boom may have a vertical post telescoped within a hollow verticle post fixed to the rear end of the tow truck. Most such mounting means for the lower boom either are quite cumbersome or create a problem in affording only a limited range of lifting movement for the immobilized vehicle.

Another problem with conventional wheel lift apparatus is that the carriages at the end of the lower boom, for engaging the underside of the wheels of the immobilized vehicle, are difficult to position beneath the wheels in cramped surroundings such as near a roadway curb. For instance, most such wheel carriages have a forward fixed frame portion for engaging the front of the wheels. The carriage is in the form of a rearwardly extending fork, and a removable rod is inserted between the arms of the fork for engaging the rear of the wheels. Should the vehicle be immobilized near a roadway curb, it either is impossible to insert the support rod or an operator must crawl completely under the immobilized vehicle to insert the rod from the inside of the carriage fork.

Another problem prevalent with wheel lift apparatus presently available is the inability to compactly fold the apparatus when not in use, particularly for folding the apparatus out of the way of operation of an overhead boom and sling mechanism.

This invention is directed to a novel wheel lift towing apparatus having features which solve one or more of the above-identified problems.

SUMMARY OF THE INVENTION

An object, therefore, of the invention is to provide a new and improved wheel lift towing apparatus adapted for mounting on the rear end of a tow truck or other towing vehicle for engaging the wheels of an immobilized vehicle to be towed.

In the exemplary embodiment of the invention, the apparatus generally includes means for mounting the apparatus at the rear end of the tow truck, and boom means extending rearwardly of the mounting means. Carriage means are disposed on the rear end of the boom means for engaging the wheels of the immobilized vehicle for lifting the vehicle. Complementary interengaging means are provided between the mounting means and the front end of the boom means for guiding upward lifting movement of the boom means relative to the mounting means and for effecting angular upward movement of the rear end of the boom means and the carriage means greater than the upward movement of the forward end of the boom means.

More specifically, the complementary interengaging means include a forwardly inclined, upwardly extending ramp for effecting angular upward tilting movement of the boom in response to the relative upward lifting movement of the boom. The inclined ramp is disposed on the mounting means for the apparatus. The boom includes a generally vertical post member at the front end thereof with a follower roller spaced upwardly from the lower end of the post member. The follower roller engages the inclined ramp for riding upwardly therealong. The mounting means for the apparatus includes a fixed fulcrum in the form of a roller at the base of the inclined ramp for bearing against the forward side of the vertical post member of the boom. Therefore, as the boom is raised by raising the vertical post member thereof, the follower roller on the post member rides along the forwardly inclined, upwardly extending ramp, as the fulcrum roller bears against the vertical post member of the boom, to tilt the boom and carriage assembly in an arc greater than the upward movement of the forward end of the boom itself.

Another feature of the invention is the provision of a carriage for engaging the underside of each wheel of the immobilized vehicle. The carriage is a fork-like structure having a pair of arms positionable on the inner and outer sides of the wheel. The inner arm has at least one aperture for the insertion thereinto of an inner end of a wheel support rod. The outer arm has a generally L-shaped notch for the insertion thereinto of the outer end of the wheel support rod in a direction generally transversely of the arm. Therefore, the wheel support rod can be properly positioned between the arms of the fork-like carriage simply by locating the outer end of the support rod downwardly into the notch, even if the immobilized vehicle is parked closely against a roadway curb.

The wheel lift apparatus also includes a novel collapsible structure for folding the apparatus upwardly into a compact position out of the way of operation of an overhead boom and sling or other mechanism on the back of the tow truck.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 2 is a perspective view of the apparatus assembled and mounted on the rear of a tow truck;

FIG. 3 is an isolated perspective view, on an enlarged scale, of one of the wheel carriages, with the wheel support rod being positioned;

FIG. 4 is an isolated perspective view similar to that of FIG. 3, with the wheel support rod and a wheel strap properly positioned with respect to the wheel;

FIG. 5 is a fragmented perspective view, on an enlarged scale, illustrating the boom and mounting means in their uppermost position as lifted by the tow truck winch;

DETAILED DESCRIPTION OF THE PREFERRED EMBODIMENT

Figure 1:
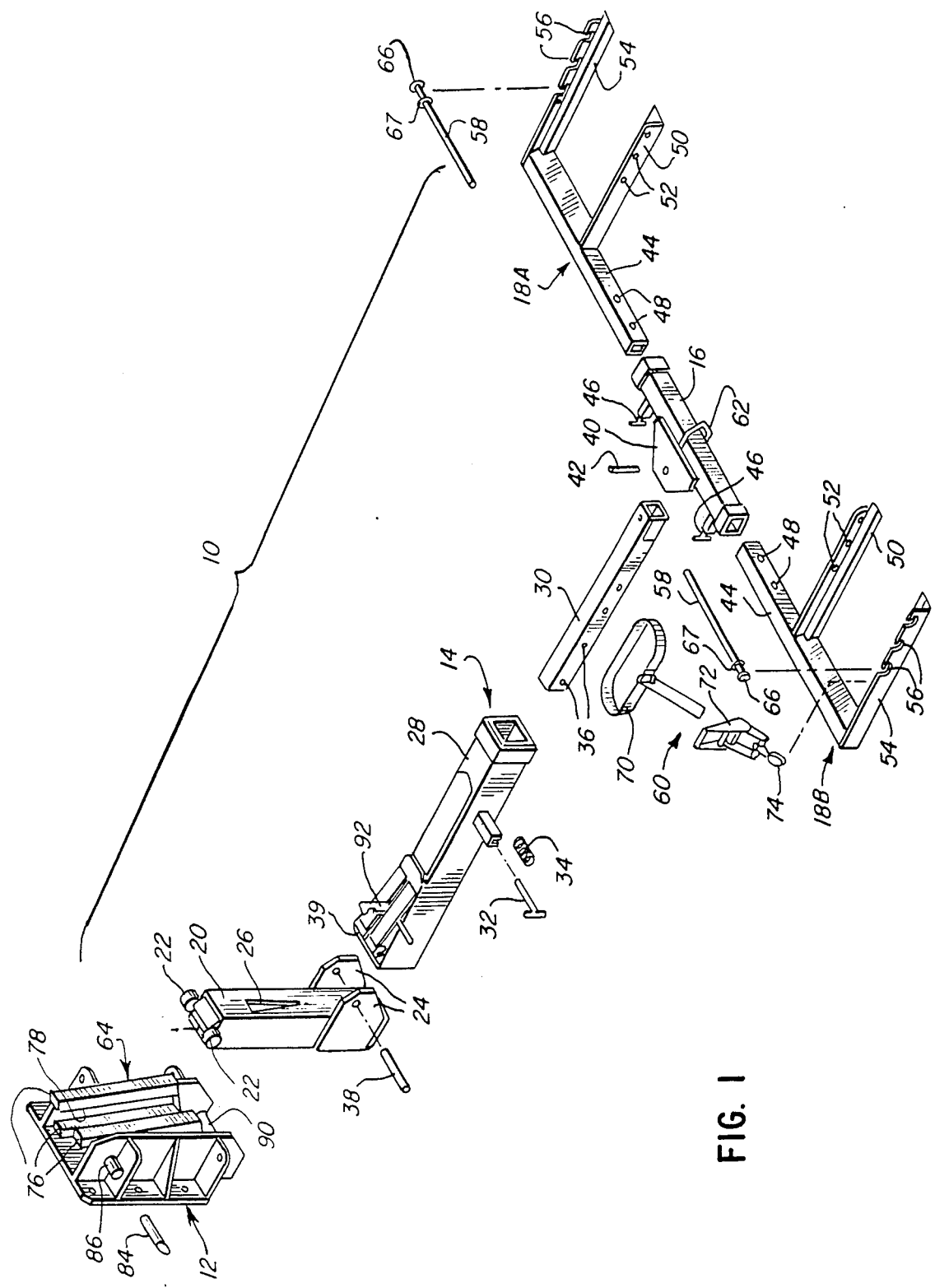
FIG. 1 is an exploded perspective view of the components of the wheel lift apparatus of the invention.

Referring to the drawings in greater detail, and first to FIG. 1, the invention is illustrated in an embodiment of a wheel lift towing apparatus, generally designated 10, for mounting on the rear end of a tow truck or other towing vehicle for engaging the wheels of an immobilized vehicle to be towed. Generally, the apparatus includes mounting means in the form of a mounting bracket, generally designated 12, for securing the apparatus to the tow truck in the rear bumper area thereof by appropriate bolts. The apparatus further includes a boom assembly, generally designated 14, extending rearwardly of mounting bracket 12 and terminating in a cross arm 16. A pair of right-hand and left-hand carriage assemblies, generally designated 18A and 18B, respectively, project perpendicularly outwardly from opposite ends of cross arm 16.

Boom assembly 14 includes a rear vertical post 20 having follower rollers 22 at the top thereof and pivot ears 24 at the bottom thereof. An elongated aperture 26 is formed in the front of verticle post 20. The boom assembly further includes a horizontal telescoping boom structure which includes a rear, outer portion 28 for telescopingly receiving a front, inner portion 30. A locking pin 32 is loaded by a spring 34 and extends through rear boom portion 28 for receipt within one of a plurality of through holes 36 in inner boom portion 30. This provides for varying the horizontal length of the boom assembly. Rear boom portion 28 is pivoted to the lower end of vertical post 20 by a pivot pin 38 extending through pivot ears 24 and a cylindrical boss 39 fixed to the top of boom portion 28. This permits the boom assembly to be folded or stowed, as described hereinafter.

Front horizontal boom portion 30 is connected to bracket means 40 of cross bar 16 by a pin 42. The cross bar is hollow and thereby adapted to telescopically receive transverse frame bars 44 of wheel carriage assemblies 18A and 18B. Spring loaded locking pins 46 on cross bar 16 are receivable in selected ones of a series of through holes 48 in each frame bar 44. This permits lateral adjustment and proper positioning of the carriage assemblies for different immobilized vehicles having varying wheel bases.

Each carriage assembly 18A, 18B includes an inner arm 50 provided with a series of fore-and-aft apertures 52 and an outer arm 54 provided with a series of fore-and-aft open notches 56 aligned with apertures 52. The apertures and notches are adapted for receiving wheel support rods 58 and a wheel strap assembly, generally designated 60, as described in greater detail hereinafter. Lastly, cross bar 16 is provided with a stowing ring 62 within which a hook of the winch cable of the tow truck can be secured for stowing the apparatus as described in greater detail hereinafter.

FIG. 2 shows all of the components described in relation to FIG. 1 in assembled condition, with the boom in its lowest condition for positioning under a vehicle to be towed. It can be seen that mounting bracket 12 is secured to the rear of a tow truck by bolts 63. Follower rollers 22 are seated within inclined ramp means, generally designated 64, on mounting bracket 12 for guiding the upward lifting movement of the wheel lift apparatus, as described in detail hereinafter.

Turning to FIG. 3, a wheel "W" is illustrated positioned between inner and outer arms 50 and 54 of left-hand wheel carriage assembly 18B. The apparatus is positioned under the vehicle such that front frame bar 44 of the wheel carriage is positioned beneath and against the front of the wheel. Wheel support rod 58 then is positioned behind the wheel at a selected location to provide lifting support for the wheel and, therefore, the immobilized vehicle.

Heretofore, it has been very difficult to position such means as wheel support rods 58 behind the vehicle wheel in cramped surroundings, such as when the vehicle to be towed has been immobilized against roadway curbing, for instance. Prior wheel carriage assemblies included apertures in both arms 50 and 54, and it was difficult or impossible to insert the wheel support rod without the operator crawling substantially under the immobilized vehicle. The invention contemplates notches 56 to be located along the upper edge of outer arm 54. The notches are open along the arm edge for receiving wheel support rod 58 in a generally transverse direction, downwardly as indicated by arrow "A". The notches are L-shaped to define hooks 65 beneath which the outer distal end of wheel support rod 58 can be locked. The rod includes a head 66 and an inwardly spaced stop ring 67 for preventing transverse movement when the rod is positioned within one of the notches 56. Once the wheel carriage 18B is properly positioned in relation to wheel "W", the inner end of wheel support rod 58 is inserted into a selected one of apertures 52 in inner arm 50 as illustrated in FIG. 3. The rod then is moved downwardly in the direction of arrow "A" for positioning within the appropriate aligned notch 56 in outer arm 54 to provide lifting support for the wheel in combination with front frame bar 44.

FIG. 4 shows wheel support rod 58 properly positioned behind the immobilized vehicle wheel. Wheel strap assembly 60 includes a flexible strap 70, a ratchet type securing buckle 72 and a positioning loop 74. The strap assembly is somewhat conventional, except that loop 74 is provided for securing to an appropriately positioned one of the hook portions 65 defined by notches 56 in outer arm 54 of wheel carriage assembly 18B.

The wheel lift towing apparatus of this invention includes novel complementary interengaging means between mounting bracket 12 and boom assembly 14, particularly the vertical post 20 of the boom assembly. More particularly, referring to FIGS. 1, 5, 6A and 6B, the mounting bracket is provided with ramp means 64 defined by two pairs of laterally spaced, vertically extending blocks 76 defining laterally spaced slots 78 between each pair of blocks 76. It can be seen that follower rollers 22 on the upper end of vertical post 20 of boom assembly 14 are positioned in slots 78. The slots and follower rollers thereby guide upward lifting movement of the boom assembly relative to mounting bracket 12. It can be seen that a hook 80 on the end of a winch cable 72 is positioned within aperture 26 of post 20 for lifting the boom assembly.

Figure 6A:
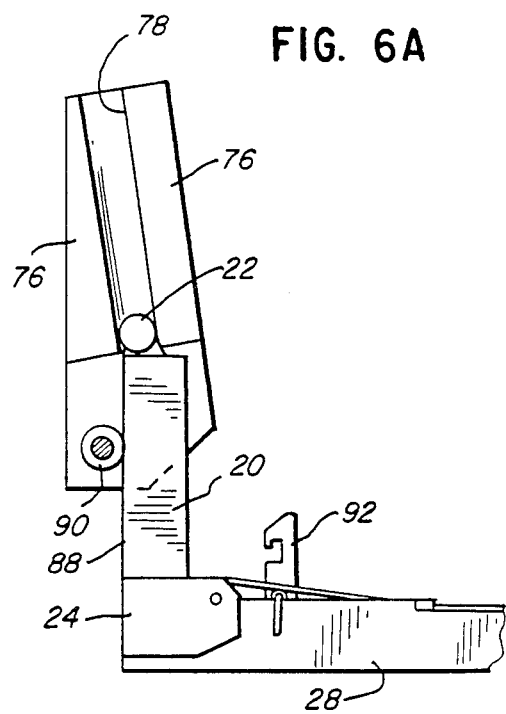
FIGS. 6A and 6B illustrate different positions of the boom follower roller along the inclined ramp of the mount.
Figure 6B:
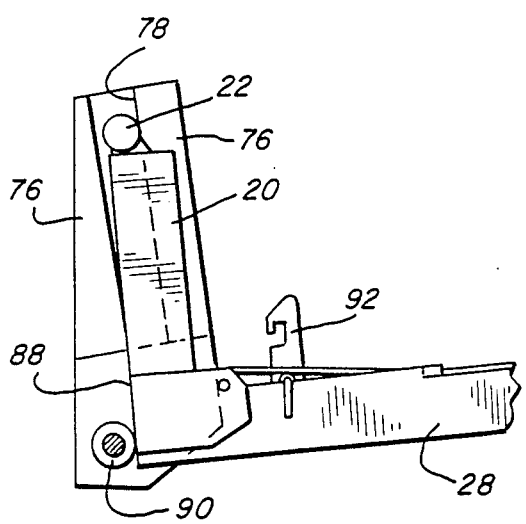

As seen best in FIGS. 6A and 6B, slots 78 are forwardly inclined relative to the tow truck in an upwardly extending direction. In essence, the interengagement of follower rollers 22 within the slots effect angular upward tilting movement of the boom assembly in response to the aforesaid upward lifting movement of the boom assembly relative to the mounting bracket. The angle of the inclined ramp means in relation to the dimensions of the boom assembly shown in the drawings is such that a twelve-inch upward lifting movement by the tow truck winch results in approximately a twenty-four inch angular upward lifting or tilting movement of the wheel carriages.

FIG. 6A shows the boom assembly, including follower rollers 22, in the lowermost position. FIG. 6B shows the boom assembly, including follower rollers 22, in the uppermost position. FIG. 5 illustrates a lock pin 84 insertable through a boss 86 on mounting bracket 12 for positioning under one of the follower rollers 22 to maintain the boom assembly in its uppermost position. As the boom assembly is lifted, a generally flat back side 88 (FIGS. 6A, 6B) of vertical boom post 20 rides along fixed fulcrum means defined by a roller 90 fixed to mounting bracket 12. This effects a biasing engagement to cause tilting movement of the boom assembly as follower rollers 22 ride in slots 78.

Figure 7:
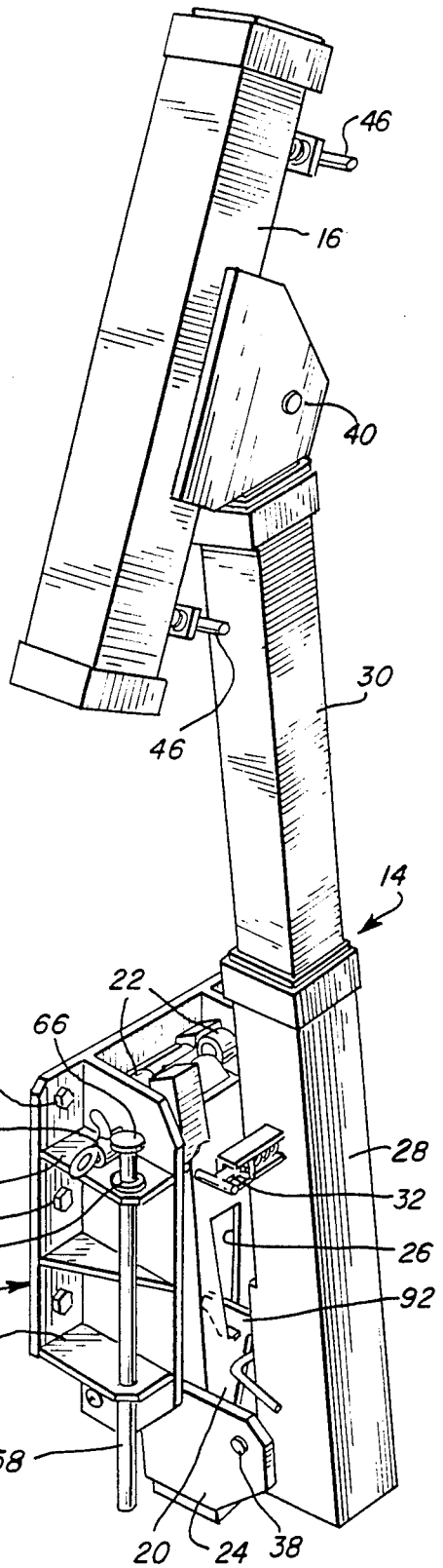
FIG. 7 is a perspective view of the boom in its folded or stowed condition.

FIG. 7 shows boom assembly 14 in a position approaching folded or stowed condition. As stated above, the boom assembly can be folded by the winch from the tow truck. Folding is accommodated by pivot pin 38 extending through pivot ears 24 of mounting bracket 12 and through cylindrical boss (not shown) on the top side of front boom portion 28. A latch hook 92 mounted on the top of boom portion 28 engages into aperture 26 of vertical boom post 20 to hold the boom assembly in stowed condition. It can be seen that cross bar 16 is swingable relative to boom portion 28 but will extend normal thereto when post 30 is in fully retracted, telescoped condition. In the stowed position, the boom assembly is folded out of the way of other towing apparatus of the tow truck. Lastly, FIG. 7 shows that means are provided for storing wheel support rods 58 in brace portions 96 of mounting bracket 12.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A wheel lift towing apparatus for the rear end of a tow truck or other towing vehicle for engaging the wheels of a vehicle to be towed, comprising:
    means for mounting the apparatus at the rear end of the tow truck;
    boom means extending rearwardly of the mounting means;
    carriage means on the rear end of the boom means for engaging the wheels of the vehicle to be towed and for lifting the vehicle; and
    complementary interengaging means between the mounting means and the front end of the boom means for guiding upward lifting movement of the boom means relative to the mounting means and for effecting angular upward movement of the rear end of the boom means and the carriage means greater than the upward movement of the forward end of the boom means, said complementary interengaging means including forwardly inclined, upwardly extending ramp means on said mounting means, the ramp means being of generally uniform cross section along the length thereof and being defined by a pair of inwardly opening parallel slots, a generally vertical post member of generally uniform cross section disposed at the front end of the boom means, a pair of follower rollers mounted directly to the upper end of the post member, one of said roller members being engageable within each of said inwardly opening slots for riding upwardly therealong and said rollers defining the pivot axis of the post member, and fixed fulcrum means on the mounting means at the base of the inclined ramp means for bearing against the front side of said vertical post member of the boom means, whereby angular upward tilting movement of the boom means is effected in response to said relative upward lifting movement of the boom means with said rollers defining both the upward guide means for the boom and the pivot point for the boom.

2. The apparatus of claim 1 wherein said fixed fulcrum means comprises a roller.

3. The apparatus of claim 1 wherein said carriage means includes at least one fork-like structure having a pair of arms positionable on the inner and outer sides of a wheel, the inner arm having aperture means for the insertion thereinto of an inner end of a wheel support rod, and the outer arm having notch means for the insertion thereinto of the outer end of the wheel support rod in a direction generally transversely of the arm, said notch means comprising a generally L-shaped notch having a vertical leg portion for receiving the wheel support rod downwardly thereinto and a horizontal leg portion for locking the wheel support rod against vertical movement.

4. A lifting apparatus for a tow truck or other towing vehicle for engaging and lifting a vehicle to be towed, comprising:
    means for mounting the apparatus on the tow truck;

boom means extending rearwardly of the mounting means and including means for engaging the vehicle; and complementary interengaging means between the mounting means and the front end of the boom means for guiding upward lifting movement of the boom means relative to the mounting means and for effecting angular upward movement of the free end of the boom means greater than the upward movement of the front end of the boom means, said complementary interengaging means including forwardly inclined, upwardly extending ramp means on said mounting means, the ramp means being of generally uniform cross section along the length thereof and being defined by a pair of inwardly opening parallel slots, a generally vertical post member of generally uniform cross section disposed at the front end of the boom means, a pair of follower rollers mounted directly to the upper end of the post member, one of said roller members being engageable within each of said inwardly opening slots for riding upwardly therealong and said rollers defining the pivot axis of the post member, and fixed fulcrum means on the mounting means at the base of the inclined ramp means for bearing against the front side of said vertical post member of the boom means, whereby angular upward tilting movement of the boom means is effected in response to said relative upward lifting movement of the boom means with said rollers defining both the upward guide means for the boom and the pivot point for the boom.

5. The apparatus of claim 4 wherein said fixed fulcrum means comprises a roller.

6. The apparatus of claim 4 including a carriage means which includes at least one fork-like structure having a pair of arms positionable on the inner and outer sides of a wheel, the inner arm having aperture means for the insertion thereinto of an inner end of a wheel support rod, and the outer arm having notch means for the insertion thereinto of the outer end of the wheel support rod in a direction generally transversely of the arm, said notch means comprising a generally L-shaped notch having a vertical leg portion for receiving the wheel support rod downwardly thereinto and a horizontal leg portion for locking the wheel support rod against vertical movement.

7. In a wheel lift towing apparatus for the rear end of a tow truck or other towing vehicle for engaging the wheels of a vehicle to be towed, the apparatus including boom means extending rearwardly of the towing vehicle, and carriage means on the free end of the boom means for engaging the wheels of the vehicle to be towed and for lifting the vehicle, an improvement in said carriage means comprising at least one fork-like structure having a pair of arms positionable on the inner and outer sides of a wheel, the inner arm having aperture means for the insertion thereinto of an inner end of a wheel support rod, and the outer arm having notch means for the insertion thereinto of the outer end of the wheel support rod in a direction generally transversely of the arm, said notch means comprising a generally L-shaped notch having a vertical leg portion for receiving the wheel support rod downwardly thereinto and a horizontal leg portion for locking the wheel support rod against vertical movement.

8. The improvement of claim 7 wherein said notch means is formed in the upper edge of the outer arm of the carriage means.

9. The improvement of claim 7, including a plurality of said notches spaced along the upper edge of the outer arm of the carriage means aligned with a plurality of apertures in the inner arm.

10. In a wheel lift towing apparatus for the rear end of a tow truck or other towing vehicle for engaging the wheels of a vehicle to be towed, the apparatus including boom means extending rearwardly of the towing vehicle, and carriage means on the free end of the boom means for engaging the wheels of the vehicle to be towed and for lifting the vehicle, an improvement in said carriage means comprising at least one fork-like structure having a pair of arms positionable on the inner and outer sides of a wheel, the outer arm having notch means for the insertion thereinto of a wheel engaging member in a direction transversely of the arm, said notch means comprising a generally L-shaped notch having a vertical leg portion for receiving the wheel engaging member downwardly thereinto and a horizontal leg portion for locking the wheel engaging member against vertical movement.

11. The improvement of claim 10 wherein said notch means is formed in the upper edge of the outer arm of the carriage means.

12. The improvement of claim 10, including a plurality of said notches along the upper edge of the outer arm of the carriage means.

* * * * *